N. B. CONVERSE.
RAISIN SEEDING MACHINE.
APPLICATION FILED MAY 25, 1909.

1,095,553.

Patented May 5, 1914.

WITNESSES
Nellie B. Keating
Leon Boillot

INVENTOR,
N. B. Converse,
BY
J. M. Wright,
ATTORNEY

UNITED STATES PATENT OFFICE.

NEWTON B. CONVERSE, OF FRESNO, CALIFORNIA, ASSIGNOR TO HIMSELF, AND FRANCIS M. WRIGHT, OF SAN FRANCISCO, CALIFORNIA, TRUSTEES.

RAISIN-SEEDING MACHINE.

1,095,553.   Specification of Letters Patent.   Patented May 5, 1914.

Application filed May 25, 1909. Serial No. 498,127.

*To all whom it may concern:*

Be it known that I, NEWTON B. CONVERSE, a citizen of the United States, residing at Fresno, in the county of Fresno and State of California, have invented new and useful Improvements in Raisin-Seeding Machines, of which the following is a specification.

The present invention relates to improvements in raisin seeding machines.

One object of the invention is to provide means for removing the seeds with less laceration of the skin of the raisin than heretofore, and without breaking the seeds; also for removing stems from the impaling cylinder.

A further object of the invention is to provide improved means for stripping the raisins.

A further object is to provide means for quickly removing, and replacing by duplicate parts, the principal moving parts of the machine except the pressure roller and its driving gearing.

Figures 1, 2:
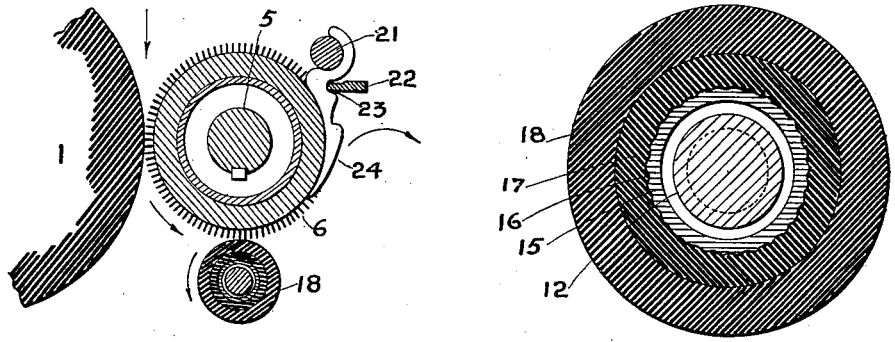
Figure 3:
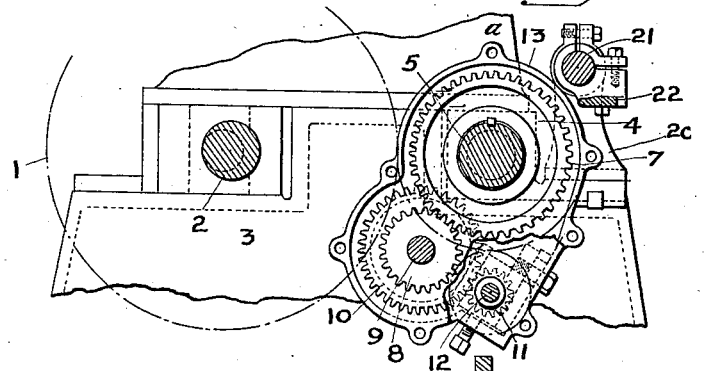
Figure 4:
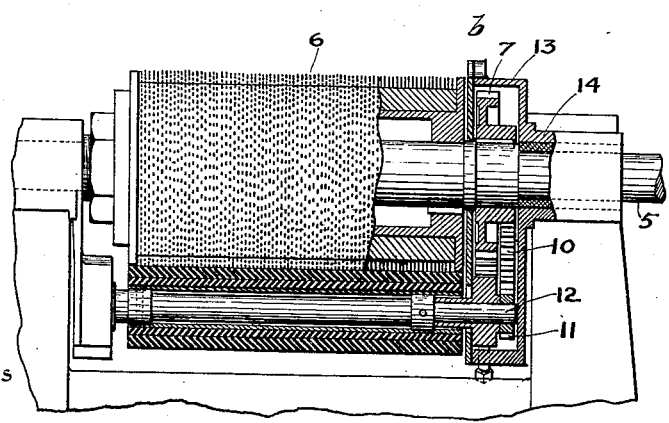

In the accompanying drawing, Figure 1 is a sectional view of the rotating parts of my improved raisin machine, the bearings being omitted for clearness of illustration; Fig. 2 is an enlarged cross section of the seed-removing cylinder; Fig. 3 is a side view of the machine; Fig. 4 is a broken front view thereof.

Referring to the drawing, 1 indicates a rubber pressure roller mounted in eccentric bearings 2 on a frame 3. Mounted in a box 4 is a shaft 5 of an impaling cylinder 6 of any suitable construction. Secured to said shaft 5 is a gear wheel 7 which meshes with a gear wheel 8 on a countershaft 9, which shaft carries a gear wheel 10 meshing with a pinion 11 on a shaft 12. Said gear wheels are inclosed within a box 13 having a hub 14 surrounding the shaft 5 of the impaling cylinder. Upon said shaft 12 is secured a steel tube 15 having longitudinal corrugations 16. Upon said tube 15 is vulcanized a sleeve 17 of hard rubber and upon said sleeve 17 is vulcanized a roller 18 of soft pliable rubber. By reason of the above gearing, the soft rubber roller 18 rotates in the same angular direction as the impaling cylinder, and the adjacent surfaces of said roller and impaling cylinder rotate in opposite directions, that of the rubber roller at a much greater speed than that of the impaling cylinder. The seeds which have been extruded from the teeth of the impaling cylinder and travel upon the ends of said teeth, but within the skin of the raisins, upon arriving at said roller 18 are embedded within the soft rubber thereof, and the latter, rotating at a comparatively high speed, breaks the skin of the raisin and removes the seed, but with much less laceration of the skin and much less removal of the pulp than when rotary metallic teeth are used to remove the seeds. A further advantage of this construction is that the seeds are not broken, as was heretofore the case by the impact of the metallic rotary seed removers. Such broken seeds remained on the teeth of the impaling cylinder and were packed with the raisins, thus greatly reducing their value. Moreover, by the frictional action of the soft rubber seed remover, stems are removed from the impaling cylinder which would otherwise be retained therein, causing much damage to the raisins.

In standards 20 secured to, and removable with, the bosses for the impaling cylinder shaft, is a stripper shaft or round bar 21. Secured to the lower box for the stripper shaft is a steel bar 22, the inner edge of which is rounded and is adapted to enter recesses 23 in the rear edges of strippers 24, said strippers having in their inner edges at their upper ends circular recesses adapted to engage the stripper shaft 21. By this means the strippers are all caused to engage the surface of the impaling cylinder between the teeth to remove the raisins therefrom. It will be observed by reference to Fig. 1 that the inner edge of the bar 22 is within, or nearer to the cylinder than, that part of the bar crossed by a line which is tangent to the impaling cylinder (below the teeth) and to the bar 21. This is an important improvement over prior construction in which the inner edge of this bar is outside of this line or farther from the cylinder. In the latter case, when the resistance applied to the back of the stripper is behind the line of pressure on the front of the stripper, the tendency of said pressure is to turn the stripper sidewise, and, therefore, the stripper tends to wear on one side more than the other or to tip over against the teeth and wear them too much. On the other hand, when the pressure in the rearward direction on the front of the stripper acts at two points behind the support, the tendency then is to maintain the stripper straight and prevent the deviation thereof from a plane transverse to the impaling cylinder.

It is important to make the pins of the impaling cylinder of as small a diameter as possible, first, because then the proportion of the area through which the pins pass to the area through which they do not pass is reduced, and less pulp is extruded from the raisins; second, because the pins, being smaller in diameter, offer less resistance to the impaling of the raisins thereon, and the pressure required of the impaling roller is reduced, and said roller can therefore be made of softer rubber. When the rubber of the pressure roller is made softer, it can stretch better over the seeds which are extruded by the ends of the teeth, that is, the seeds are embedded better in the rubber of the pressure roller. Being better embedded, the skin of the raisins is better stretched over the seed, and less pulp remains around the seed. Consequently, when the skin is broken and the seed removed from the raisin, less of the pulp is taken with it, and there is less shrinkage of the raisins in seeding. But a reduction in the diameter of the teeth would, other things remaining equal, mean a reduction in stiffness, and it is important that they should be sufficiently stiff, because, if not, the pins would be sprung aside at their ends by the pressure of a seed pressed in between said ends, that is, they would not equally well fulfil their office of excluding the seeds from entering between the pins. The teeth might be made smaller in diameter and at the same time equally stiff by making them shorter. But the difficulty in making them shorter is that strippers, of the form and construction heretofore employed, could not then pass beneath the raisins to strip them from the pins. Such strippers as heretofore used have been made with comparatively blunt ends, in order to wear a sufficiently long time. They have, notwithstanding said blunt ends, been able to pass beneath the raisins to strip them from the teeth, because the impaling cylinder, between the circumferential rows of teeth, was made with circumferential grooves below the base of the teeth. This is a comparatively easy construction when forming the cylinders of saws and interposed spacing washers, which is the construction heretofore employed commercially, but it is an expensive and impracticable construction in a cylinder made by setting wire pins in a cylindrical body, impracticable for the reason that the body of the cylinder between the grooves and around the base of the pins would break away, unless made of hard and tough metal, and it is not practicable to make the cylinders of such metal when they are made by setting pins in a cylindrical body. Three difficulties therefore have to be overcome. The cylinder must not be made with grooves, the strippers must pass beneath the raisins when impaled upon the impaling cylinder, and the strippers must not wear out too soon. I overcome the first two of the above difficulties by making the strippers with ends brought to a sharp point, and I overcome the third by hardening the points. Only the point of the stripper is hardened, for if the whole stripper were so hardened, it would warp and spring out of shape. By hardening only the point, this result does not occur. I am thus enabled to form an impaling cylinder in which the pins are only 7/32 of an inch long, the depth to which the raisins are embedded in the impaling cylinder being 3/16 of an inch, thus leaving a distance of 1/32 of an inch between the raisin and the base of the pins through which the point of the stripper can pass to strip the raisin from the pins. By reducing the length of the pins to 7/32 of an inch, the diameter can be reduced to 41/1000 of an inch in diameter from 50/1000 of an inch in diameter, the number of pins per square inch remaining the same. The punctured area is of course reduced in the proportion of the squares of these diameters, that is, about one-third; consequently the impaling resistance is reduced proportionately, and the amount of shrinkage through extrusion of pulp or improper impaling is reduced in the same proportion, all without sacrificing the stiffness of the teeth.

The reason for tempering only the point of the strippers is that if the whole stripper were tempered it would warp and spring out of shape, but by tempering only the point, this result does not occur.

A further important advantage results in the construction by which the impaling cylinder, the seed removing roller, its driving gears and supports, the fruit strippers and their supports, and, in fact, all the essential parts of a seeding machine except the rubber impaling roller, and the driving pulley and its shaft and gears and the main frame are removable in a single piece. The object is to avoid the stopping of the operation of the entire plant, when the more delicate parts of the seeding machine, such as the pin cylinder, fruit strippers, or the like, get out of order or are worn out.

By the words "pliable," "short," "slender" and "sharp" is meant that the respective elements have these properties or characteristics to a greater degree than has heretofore been practised in the art.

I claim:—

1. In a raisin seeder, a seed remover consisting of a soft rubber roller and means for rotating it so that the surface moves in an opposite direction to that of the impaling cylinder, substantially as described.

2. In a raisin seeding machine, the combination of an impaling cylinder, strippers, one terminal portion of each engaging the impaling cylinder, a bar on the same side of the strippers as the impaling cylinder, and engaging the other terminal portion of each stripper, and a bar on the other side of said strippers, from said impaling cylinder, said bar engaging the edge of each stripper at a point intermediate between the points of engagement therewith of the first named bar and of the cylinder on the same side as the cylinder of the line joining said points, substantially as described.

3. In combination with a cylinder and short and slender pins rigidly secured therein in circumferential rows, a pliable soft rubber roller for impaling raisins on said pins, and strippers for said cylinders having sharp points adapted to pass beneath the raisins impaled upon said pins to strip them from the pins, the points of said strippers being harder than the remainder thereof.

4. In a raisin seeding machine, the combination of a pressure roller, an impaling cylinder, a seed remover, fruit strippers, a frame for supporting the pressure roller, and a unitary frame for the impaling cylinder, seed remover, fruit strippers and their supports, the latter frame being removable independently of the former, substantially as described.

In testimony whereof I have hereunto set my hand in the presence of two subscribing witnesses.

NEWTON B. CONVERSE.

Witnesses:
  FRANCIS C. HUEBNER,
  ARTHUR H. DREW.

---

Copies of this patent may be obtained for five cents each, by addressing the "Commissioner of Patents, Washington, D. C."